United States Patent [19]
Nagashima et al.

[11] Patent Number: 6,111,097
[45] Date of Patent: Aug. 29, 2000

[54] PROCESS FOR PRODUCING CARBOXYPOLYSACCHARIDE

[75] Inventors: Hiromitsu Nagashima; Hisashi Sakaitani; Hidechika Wakabayashi; Toshiaki Kozaki, all of Tokyo, Japan

[73] Assignee: Mitsubishi Gas Chemical Company, Inc., Tokyo, Japan

[21] Appl. No.: 09/325,878

[22] Filed: Jun. 4, 1999

[30] Foreign Application Priority Data

| Jun. 4, 1998 | [JP] | Japan | 10-156056 |
| Jun. 22, 1998 | [JP] | Japan | 10-174755 |
| Jun. 26, 1998 | [JP] | Japan | 10-180901 |

[51] Int. Cl.$^7$ .................................................. C08B 37/02
[52] U.S. Cl. ............................................................ 536/113
[58] Field of Search .............................. 536/30, 32, 55.1, 536/63, 123.1, 127, 128

[56] References Cited

U.S. PATENT DOCUMENTS

| 5,424,419 | 6/1995 | Hasegawa et al. | 536/113 |
| 5,766,572 | 6/1998 | Hasegawa et al. | 424/9.322 |
| 5,906,997 | 5/1999 | Schartz et al. | 536/123.1 |

FOREIGN PATENT DOCUMENTS

| 235576 | 9/1984 | Czechoslovakia . |
| 47-40552 | 10/1972 | Japan . |
| 49-1281 | 1/1974 | Japan . |
| 6-31840 | 4/1994 | Japan . |
| 9-71601 | 3/1997 | Japan . |

OTHER PUBLICATIONS

Shigemasa et al., Polymer J., vol. 23, No. 10, pp. 1279–1281 (1991).

F.S. Martin, J. Chem. Soc., pp. 2564–71, (1954).

*Primary Examiner*—James O. Wilson
*Attorney, Agent, or Firm*—Antonelli, Terry, Stout & Kraus, LLP

[57] ABSTRACT

In a process of producing a carboxypolysaccharide by oxidizing a polysaccharide in the presence of a ruthenium compound and an oxidizing agent, the expensive ruthenium is easily and efficiently recovered. Ruthenium dissolved in a reaction mixture after the oxidation of the polysaccharide is converted, after or without being subjected to a heat. treatment, to high oxidation sate, which is then recovered by the extraction with a water-insoluble organic solvent. The recovered ruthenium is reduced to low oxidation state and reused in a subsequent production of the carboxypolysaccharide.

19 Claims, No Drawings

6,111,097

PROCESS FOR PRODUCING CARBOXYPOLYSACCHARIDE

BACKGROUND OF THE INVENTION

The present invention relates to a process for producing a carboxypolysaccharide, and more particularly to a process for producing a carboxypolysaccharide or a salt thereof by oxidizing a polysaccharide in the presence of a ruthenium compound and ail oxidizing agent while recovering ruthenium to reuse it. The carboxypolysaccharide and the salt thereof obtained by the process of the present invention is advantageously used as a scale deposit inhibitor, a pigment dispersant, a sizing agent, a mixing aid for concrete and a builder for detergents.

As a builder for detergents, a polymer of acrylic acid or a copolymer of acrylic acid and maleic acid have heretofore been produced industrially. However, these synthetic polycarboxylic acids are very difficult to be biodegraded by microorganisms due to its vinyl polymer structure which is a chemical structure not generally found in natural macromolecular substances. Therefore, a polycarboxylic acid produced by carboxylation of a polysaccharide is expected to be useful as a biodegradable builder, solving the above problem.

For example, a process for oxidizing a polysaccharide with a salt of hypochlorous acid or a combination of periodic acid and a salt of chlorous acid is disclosed in Japanese Patent. Publication No. 49-1281. It is described therein that a dicarboxystarch obtained by oxidation of C2 and C3 positions of a monosaccharide unit constituting the polysaccharide is usable as a builder for detergent. Japanese Patent Publication No. 47-40552 and Czechoslovakian Patent No. 235576 disclose a method for producing a tricarboxypolysaccharide by converting a starch to an aldehyde with a salt of periodic acid and then carboxylating the aldehyde by oxidation with dinitrogen tetraoxide. However, since an expensive salt of periodic acid must be used in the proposed processes, the industrial application of these processes is costly disadvantageous.

Japanese Patent Application Laid-Open No. 9-71601 discloses a process in which a starch is carboxylated with a salt of hypochlorous acid in the presence of a ruthenium catalyst while adjusting pH of the reaction system to a basic condition. Since ruthenium used in this process is a very expensive transition metal, it has been strongly desired to minimize the loss of ruthenium during the production of a tricarboxystarch as well as to recover and reuse ruthenium. However, although Japanese Patent Application Laid-Open No. 9-71601 teaches the improvement in color of the polycarboxylic acid by treating the oxidation product with a reducing agent such as a salt of sulfurous acid and filtering off the resulting precipitate, the document considers nothing about decreasing the content of ruthenium in the final polycarboxylic acid as well as recovering and reusing the ruthenium catalyst.

Japanese Patent Publication No. 6-31840 discloses a process for removing radioactive ruthenium from a solution of a used nuclear fuel. However, the recovery and reuse of ruthenium in the process of producing a polycarboxylic acid (carboxypolysaccharide) are not taught therein.

Thus, no industrial process for recovering and reusing ruthenium in a process for producing a polycarboxylic acid (carboxypolysaccharide) has been proposed in the art.

SUMMARY OF THE INVENTION

Accordingly, an object of the present invention is to provide an industrially applicable process of recovering and reusing ruthenium in the production of a carboxypolysaccharide by oxidizing a polysaccharide in the presence of ruthenium and an oxidizing agent.

As a result of extensive studies, the inventors have found that ruthenium is effectively extracted and recovered by adding an oxidizing agent to a reaction mixture after completing the synthesis of the carboxypolysaccharide and then extracting the reaction mixture with a water-insoluble organic solvent with or without heating the reaction mixture prior to the addition of the oxidizing agent. It has been also found that ruthenium is more effectively recovered by heating the solution subjected to the above extraction, adding an oxidizing agent to the heated solution, and extracting the resulting solution with a water-insoluble organic solvent. The inventors have further found that ruthenium thus recovered can be reused in the process for producing a carboxypolysaccharide by adding a reducing agent to the extract.

Accordingly, a first embodiment of the present invention is a process for producing a carboxypolysaccharide, comprising the steps of (1) oxidizing a polysaccharide in an aqueous medium using a combination of a ruthenium compound and an oxidizing agent; (2) adding an oxidizing agent to a reaction mixture obtained after the oxidation to convert ruthenium to high oxidation state; (3) recovering the ruthenium of high oxidation state by extracting the reaction mixture with a water-insoluble organic solvent; and (4) separating the carboxypolysaccharide from a residual solution after the ruthenium recovery of the step (3).

A second embodiment of the present invention is a process for producing a carboxypolysaccharide, comprising the steps of (1) oxidizing a polysaccharide in an aqueous medium using a combination of a ruthenium compound and an oxidizing agent; (2) adding an oxidizing agent to a reaction mixture obtained after the oxidation to convert ruthenium to high oxidation state; (3) recovering the ruthenium of high oxidation state by extracting the reaction mixture with a water-insoluble organic solvent; (4) heat-treating a residual solution after the step (3) at 50° C. to a boiling point of the residual solution at ordinary pressure; (5) adding an oxidizing agent to the residual solution after the heat treatment to convert a remaining ruthenium to high oxidation state; (6) recovering the ruthenium of high oxidation state by extracting the residual solution with a water-insoluble organic solvent; and (7) separating the carboxypolysaccharide from the residual solution after the ruthenium recovery of the step (6).

A third embodiment of the present invention is a process for producing a carboxypolysaccharide, comprising the steps of (1) oxidizing a polysaccharide in an aqueous medium using a combination of a ruthenium compound and an oxidizing agent; (2) heat-treating a reaction mixture obtained after the oxidation at 50° C. to a boiling point of the reaction mixture at ordinary pressure; (3) adding an oxidizing agent to the reaction mixture after the heat treatment to convert ruthenium to high oxidation state; (4) recovering the ruthenium of high oxidation state by extracting the reaction mixture with a water-insoluble organic solvent; and (5) separating the carboxypolysaccharide from a residual solution after the ruthenium recovery of the step (4).

A fourth embodiment of the present invention is a process for producing a carboxypolysaccharide further comprising a step of recovering ruthenium by adding a reducing agent to an extract obtained in the step of ruthenium recovery by extraction, and a step of reusing the recovered ruthenium in a subsequent oxidation of the polysaccharide.

DETAILED DESCRIPTION OF THE INVENTION

The polysaccharide usable in the present invention may include an α-linked polysaccharide such as starch, amylose, amylopectin, pectin, protopectin and pectic acid and a β-linked polysaccharide such as cellulose. Starch is preferable because the oxidation reaction proceeds easily. Examples of starch include corn starch, potato starch, tapioca starch, wheat starch, sweet potato starch and rice starch. A water-soluble, low-molecular weight starch derived from the above starch may be also used. The above stating polysaccharide may be used in a concentration of 0.1 to 80% by weight, preferably 1 to 50% by weight in the reaction solution.

The carboxypolysaccharide produced by the process of the present invention is a tricarboxypolysaccharide having a structure in which 10% by mole or more in average of the free or esterified primary alcohol radical at C6 position of the pyranose ring of the monosaccharide constituting the polysaccharide is oxidized to a carboxyl radical which may be hydrolyzed to a salt thereof and, at the same time, 10% by mole or more in average of the secondary alcohol radicals at C2 and C3 positions of the pyranose ring are oxidized to carboxyl radicals or salts thereof with cleavage of the bond between C2 and C3 positions. The carboxypolysaccharide has an average molecular weight of 1,000 to 100,000.

The polysaccharide is oxidized by ruthenium in a high oxidation state formed by a ruthenium compound and an oxidizing agent. The "ruthenium in a high oxidation state" referred to hereinafter is ruthenium having an atomic valency of VI to VIII. Examples of the ruthenium compound usable in the present invention include ruthenium metal; ruthenium oxide such as ruthenium dioxide and ruthenium tetraoxide; salt of ruthenic acid such as sodium ruthenate; ruthenium halide such as ruthenium chloride and ruthenium bromide; ruthenium nitrate; ruthenium sulfate; ruthenium carboxylate such as ruthenium acetate; and ruthenium complex such as ammonium hexachlororuthenate, potassium hexachlororuthenate, potassium pentachloroaquoruthenate, ammonium pentachloroaquoruthenate, potassium pentachloronitrosylruthenate, hexammineruthenium chloride, hexammineruthenium bromide, hexammineruthenium iodide, nitrosylpentammineruthenium chloride, hydroxonitrosyltetrammineruthenium nitrate, ruthenium ethylenediaminetetraacetate and ruthenium dodecacarbonyl. The ruthenium compound is used in a catalytic amount of 0.00001 to 1.0 mole, preferably 0.0001 to 0.1 mole per 1 mole of the monosaccharide unit constituting the starting polysaccharide.

The oxidizing agent used in combination with the ruthenium compound for oxidizing the polysaccharide may be at least one selected from the group consisting of molecular halogen such as chlorine and iodine; halogen oxides such as dichlorine monoxide, chlorine dioxide, dibromine monoxide and bromine dioxide; perhalogenic acid such as periodic acid and perchloric acid and a salt thereof; halogenic acid such as bromic acid and chloric acid and a salt thereof; halogenous acid such as bromous acid and chlorous acid and a salt thereof; hypohalogenous acids such as hypobromous acid and hypochlorous acid and a salt thereof; molecular oxygen; peracid such as performic acid, peracetic acid and perbenzoic acid; hydroperoxide such as cumene hydroperoxide and benzyl hydroperoxide; peroxide such as tert-butyl benzyl peroxide, dibenzoyl peroxide and hydrogen peroxide; persulfuric acid such as peroxydisufuric acid, Caro's acid and a salt thereof; and salt of ferricyanic acid such as potassium ferricyanate and sodium ferricyanate. Among these oxidizing agents, a water-soluble halogenic acid and salt thereof are preferable. In the oxidation reaction of the polysaccharide, the oxidizing agent is used 1.0 to 10 moles, preferably 1.5 to 8 moles per one mole of the starting polysaccharide.

The solvent for the oxidation reaction of the polysaccharide may be an aqueous medium including water and a mixed solvent of water and a solvent inert to the oxidizing agent. The solvent inert to the oxidizing agent may include organic acid such as acetic acid; halogenated carbon such as carbon tetrachloride, chloroform and dichloromethane; saturated aliphatic hydrocarbon such as pentane, hexane and n-heptane; and saturated alicyclic hydrocarbon such as cyclohexane. Among these solvents, organic acid, halogenated carbon and saturated aliphatic hydrocarbon are preferable. When the mixed solvent of water and the solvent inert to the oxidizing agent is not homogeneous, the reaction rate can be increased by stirring sufficiently.

In the present invention, the oxidation reaction of the polysaccharide is carried out at 0 to 100° C. at pH of 1 to 13 while slowly adding the oxidizing agent over 0.5 to 10 hours to a mixture of the polysaccharide, the ruthenium compound and the aqueous medium under stirring to form ruthenium of a high oxidation state. The oxidation reaction of the polysaccharide is usually completed within 0.5 to 12 hours. The reaction mixture contains, in addition to the formed carboxypolysaccharide, the ruthenium compound, the solvent, and a small amount of the non-reacted polysaccharide. The carboxypolysaccharide is separated by a conventionally known method after the step of recovering ruthenium described below.

The recovery of ruthenium in the present invention is carried out by an extraction process comprising a first step of adding an oxidizing agent to the reaction mixture after the oxidation of the polysaccharide thereby converting ruthenium to a high oxidation state, and a second step of extracting ruthenium in a high oxidation state from the reaction mixture with a water-insoluble organic solvent.

(A) First Step (Step of Adding Oxidizing Agent)

It is well known that ruthenium tetraoxide, a high oxidation state ruthenium compound, is volatile and oil-soluble, and easily dissolves in a non-oxygen solvent such as carbon tetrachloride and chloroform (F. S. Martin, J. Chem. Soc., 2564 (1954)). The first step is conducted to enhance the efficiency of ruthenium extraction by converting a low oxidation state ruthenium present in the solution to a high oxidation state ruthenium, i.e., ruthenium tetraoxide, as much as possible by adding the oxidizing agent at a stage close to the end of the oxidation reaction of the polysaccharide prior to the extraction in the second step. When this step is omitted, only ruthenium tetraoxide already present at the stage close to the end of the reaction is mainly extracted in the extraction of the second stage and the efficiency of ruthenium extraction unfavorably decreases. Examples of the oxidizing agent usable in this step may include the same oxidizing agents as those described above with respect to the oxidizing agent for use in the oxidation reaction of the polysaccharide. The oxidizing agent in this step may be the same as or different from that used in the oxidation reaction of the polysaccharide. In view of easiness of the treatments after the reaction, it is preferable that the same oxidizing agent is used in the oxidation reaction of the polysaccharide and the first step. The amount of the oxidizing agent used in the first step is 1 to 100 moles, preferably 1 to 50 moles per 1 mole of the ruthenium in the solution. The oxidizing agent may be added to the reaction mixture with pH of 1 to 13 without adjusting the pH. However, in view of the stability of the oxidizing agent added to the solution and ruthenium tetraoxide to be formed, it is preferable that the oxidizing agent is added after pH is adjusted to 2 to 13, more preferably to 4 to 10.

(B) Second Step (Step of Solvent Extraction)

The second step is a step of extracting the high oxidation state ruthenium (ruthenium tetraoxide) with a water-insoluble organic solvent. The extraction is conducted by mixing the aqueous solution from the first step with a water-insoluble organic solvent and then liquid-liquid separating the mixture. The mixing and the liquid-liquid separation may be carried out in a known extraction apparatus such as single-stage or multi-stage mixer settler and an extraction column. The extraction solvent is required to be inert to ruthenium tetraoxide and insoluble in water. Examples of the water-insoluble solvent include halogenated hydrocarbon such as perfluoroheptane, perfluoropentane, perfluoromethylcyclohexane, carbon tetrachloride, chloroform and dichloromethane; saturated aliphatic hydrocarbon such as n-pentane, n-hexane and n-heptane; saturated alicyclic hydrocarbon such as cyclohexane; and liquid paraffin. Among these solvents, the halogenated hydrocarbon and saturated aliphatic hydrocarbon are preferable. The extraction solvent may be used with or without purification. Although a higher extraction temperature increases the extraction speed, the extraction is carried out at 0 to 100° C., preferably 10 to 80° C. at ordinary pressure in view of the volatility of ruthenium tetraoxide.

To further improve the efficiency of ruthenium extraction, the reaction mixture from the oxidation reaction of the polysaccharide may be heat-treated as described below prior to the extraction process of the first and second steps.

(C) Heat Treatment

The reaction mixture is heated to 50° C. to its boiling point at ordinary pressure. A temperature lower than 50° C. unfavorably requires a longer time to increase the efficiency of extracting ruthenium. When the temperature exceeds the above range, decomposition of the carboxypolysaccharide takes place. The solution to be heat-treated is adjusted to preferably pH 7 to 13, more preferably pH 8 to 10 because the carboxypolysaccharide is likely decomposed in an acidic condition. The heating time is 5 minutes to 24 hours, preferably 30 minuets to 10 hours although depending on other conditions. The heat treatment temperature and time may be changed by changing the pressure. The heating method is not particularly limited, and a conventional heating method such as heating by a heat exchanger using steam or hot water, heating by a heater, infrared ray heating and induction heating may be used.

After the heat treatment, ruthenium of low oxidation state is converted to high oxidation state by the first step and the high oxidation state ruthenium is extracted with a water-insoluble organic solvent in the same manner as in the second step.

As described above, after subjected to the heat treatment (C) or not, the reaction mixture from the oxidation reaction of the polysaccharide is subjected to the extraction process of the first and second steps. The reaction mixture thus subjected to the extraction process may be further subjected to the heat treatment (C) and followed again by the extraction process of the first and second steps, thereby further improving the efficiency of ruthenium recovery. Such a successive treatment of the heat treatment (C), the addition of the oxidizing agent (first step) and the extraction with the water-insoluble organic solvent (second step ) may be further repeated after the preceding extraction process. The heat treatment prior to the extraction process enhances the extraction and recovery efficiency of ruthenium, thereby reducing the ruthenium content in the final carboxypolysaccharide to less than 100 ppm.

The high oxidation state ruthenium extracted as described above is reduced by a reducing agent to a low oxidation state and reused in the subsequent oxidation reaction of the polysaccharide as described below.

(D) Reduction and Reuse of Ruthenium

The extracted ruthenium tetraoxide is precipitated as a low oxidation state ruthenium oxide using a reducing agent. The precipitate is recovered by filtration or evaporation to dryness. The recovered ruthenium is reused in the next run of the oxidation reaction of the polysaccharide in the died form or as a dispersion in water. The reducing agent may be a usual reducing agent such as a salt of sulfurous acid; hydrazine and a salt thereof; hydroxylamine and a salt thereof, hydrogen peroxide, a quinone compound and a lower alcohol such as methanol, ethanol and 2-propanol. The amount of the reducing agent is 1 to 100 moles, preferably 1 to 50 moles per 1 mole of ruthenium.

The present invention is described in detail with reference to the following examples. The concentration of ruthenium in the tricarboxystarch was measured by ICP (inductively coupled plasma) spectrometry using a 1200VR type apparatus manufactured by Seiko Denshi Kogyo Co., Ltd. The content of sodium chloride in the tricarboxystarch was measured by XRF (X-ray fluorescence analysis) using RIX 3100 manufactured by Rigaku Denki Co., Ltd.

EXAMPLE 1

Into a 300-ml round bottom Pyrex flask equipped with a stirrer, a thermometer and a pump, were placed 25 ml of water, 7.5 g of corn starch (manufactured by Shikishima Starch Co., Ltd.) and 0.299 g of ruthenium oxide (ruthenium content: 52% by weight) and the mixture was cooled to 20° C. over a cooling water bath while stirring. To the cooled mixture, was added over a period of 3 hours 12.9% by weight aqueous solution of sodium hypochlorite in an amount corresponding to 5 moles of sodium hypochlorite per one mole of the starch. The reaction solution was adjusted to pH 9.0 using 2N aqueous solution of sodium hydroxide.

After the addition was completed, the reaction solution was divided into three 70-ml portions. One of the portions was left at pH 9 and two other portions were respectively adjusted to pH 4 and 7 with an aqueous hydrochloric acid. To each of the above portions, 2 g of a 12.9% by weight aqueous solution of sodium hypochlorite and 20 g of carbon tetrachloride were added. The resultant mixtures were shaken at room temperature for 1 minute, centrifuged under 2,000 rpm for 1 minute and left standing for 1 minute. Then, the carbon tetrachloride layer dissolving ruthenium tetraoxide was separated from the aqueous layer. This operation of extraction was repeated 4 times at room temperature. After adding 2-propanol, the combined extract for each portion was evaporated to dryness under a reduced pressure to obtain ruthenium oxide.

To the residual solution for each portion, was added methanol in an amount twice the amount of the residual solution to form white precipitate. The precipitate was separated by filtration, dissolved in water, precipitated again by addition of methanol and vacuum-died at 60° C. for 5 hours to obtain each of Products I, II and III from the solutions of pH 4, 7 and 9, respectively.

Products I, II and III were analyzed by $^{13}$C-NMR and IR, and as a result thereof, all found to be the same sodium salt of tricarboxystarch in which 100% by mole of the primary alcohol radicals at C6 position of the glucopyranose unit constituting the staling corn starch were oxidized to carboxyl groups, and 75% by mole of the secondary alcohol radicals at C2 and C3 positions were oxidized to the carboxyl groups with cleavage of the bond between C2 and C3 positions.

The concentrations of ruthenium in Products I, II and III were measured by ICP and found to be 300 ppm (ruthenium removal ratio: 98.0% by weight), 318 ppm (ruthenium removal ratio: 97.9% by weight) and 226 ppm (ruthenium removal ratio: 98.5% by weight), respectively.

EXAMPLE 2

The oxidation reaction of corn starch was conducted in the same manner as in Example 1 except that the amount of ruthenium oxide was changed to 0.05 g and pH was changed to 4.0. After the reaction was completed, the reaction solution was divided into three 70-ml portions. One of the portions was left at pH 4 and two other portions were respectively adjusted to pH 7 and 9 with 2N aqueous solution of sodium hydroxide. Then, each portion was subjected to the same treatments as in Example 1 to obtain Products IV, V and VI from the respective residual solutions after the extraction having pH 4, 7 and 9, respectively.

Products IV, V and VI were analyzed by $^{13}$C-NMR and IR, and as a result thereof, all found to be the same sodium salt of tricarboxystarch in which 100% by mole of the primary alcohol radicals at C6 position of the glucopyranose unit constituting the starting corn starch was oxidized to carboxyl groups, and 80% by mole of the secondary alcohol radicals at C2 and C3 positions were oxidized to carboxyl groups with cleavage of the bond between C2 and C3 positions.

The concentrations of ruthenium in Products IV, V and VI were measured by ICP and found to be 350 ppm (ruthenium removal ratio: 87.0% by weight), 378 ppm (ruthenium removal ratio: 86.0% by weight) and 297 ppm (ruthenium removal ratio: 89.0% by weight), respectively.

EXAMPLE 3

The oxidation reaction of corn starch was conducted in the same manner as in Example 1 except that 0.327 g of ruthenium chloride (ruthenium content: 42% by weight) was used. After the reaction was completed, Products VII, VIII and IX were obtained from respective residual solutions after extraction having pH 4, 7 and 9 in the same manner as in Example 1.

Products VII, VIII and IX were analyzed by $^{13}$C-NMR and IR, and as a result thereof, all found to be the same sodium salt of tricarboxystarch as that obtained in Example 1. The concentrations of ruthenium in Products VII, VIII and IX were measured by ICP and found to be 85 ppm (ruthenium removal ratio: 99.4% by weight), 92 ppm (ruthenium removal ratio: 99.4% by weight) and 78 ppm (ruthenium removal ratio: 99.5% by weight), respectively.

EXAMPLE 4

The oxidation reaction of corn starch was conducted in the same manner as in Example 2 except that 0.055 g of ruthenium chloride (ruthenium content: 42% by weight) was used. After the reaction was completed, Products X, XI and XII were obtained from the respective residual solutions after extraction having pH 4, 7 and 9 in the same manner as in Example 2.

Products X, XI and XII were analyzed by $^{13}$C-NMR and IR, and as a result thereof, all found to be the same sodium salt of tricarboxystarch as that obtained in Example 2. The concentrations of ruthenium in Products X, XI and XII were measured by ICP and found to be 280 ppm (ruthenium removal ratio: 89.6% by weight), 261 ppm (ruthenium removal ratio: 90.3% by weight) and 261 ppm (ruthenium removal ratio: 90.3% by weight), respectively.

EXAMPLE 5

The same procedures as in Example 1 were repeated except that, after the oxidation reaction of corn starch was completed, the reaction solution having pH of 9.0 was divided into two 70-ml portions and n-heptane or perfluoroheptane was used as the extraction solvent in place of carbon tetrachloride. Products XIII and XIV obtained was found to be the same sodium salt of tricarboxystarch as that obtained in Example 1. The concentrations of ruthenium in Products XIII and XIV were measured by ICP and found to be 198 ppm (ruthenium removal ratio: 98.8% by weight) and 4,397 ppm (ruthenium removal ratio: 70.7% by weight), respectively.

EXAMPLE 6

The same procedures as in Example 1 were repeated except that, after the oxidation reaction of corn starch was completed, a 70-ml portion of the reaction solution having pH 9.0 was extracted with carbon tetrachloride at 50° C. repeatedly 4 times. Product XV obtained was found to be the same sodium salt of tricarboxystarch as that obtained in Example 1. The concentration of ruthenium in Product XV was measured by ICP and found to be 134 ppm (ruthenium removal ratio: 99.1% by weight). This shows that the extraction at 50° C. reduces the ruthenium concentration in the product much more than the extraction at room temperature as seen from the result on Product III of Example 1, 226 ppm (ruthenium removal ratio: 98.51 by weight).

EXAMPLE 7

Into a 300-ml round bottom Pyrex flask equipped with a stirrer, a thermometer and a pump, were placed 25 ml of water, 7.5 g of corn starch (manufactured by Shikishima Starch Co., Ltd.) and 0.327 g, corresponding to 1.39 mmoles of ruthenium, of ruthenium chloride (ruthenium content: 43% by weight) and the mixture was cooled to 20° C. over a cooling water bath while stirring. To the cooled mixture, was added over a period of 3 hours 12.9% by weight aqueous solution of sodium hypochlorite in an amount corresponding to 5 moles of sodium hypochlorite per one mole of the starch. The reaction solution was adjusted to pH 9.0 using 2N aqueous solution of sodium hydroxide.

After the reaction was completed, the reaction solution was divided into several 40-g portions. To one of the portions, were added 1 g of 12.9% by weight aqueous solution of sodium hypochlorite and 10 g of n-heptane. The resultant mixtures was shaken at room temperature for 1 minute, centrifuged under 2,000 rpm for 1 minute and left standing for 1 minute. Then, the n-heptane layer dissolving ruthenium tetraoxide was separated from the aqueous layer. This extraction operation was repeated 4 times at room temperature. After adding 2-propanol, the combined extract was evaporated to dryness under a reduced pressure to obtain ruthenium oxide.

The residual solution after the extraction was placed into a 100 ml round bottom Pyrex reaction flask equipped with a thermometer and a condenser, and heated to 98° C. over an oil bath under refluxing for 2 hours at ordinary pressure. After cooling, the solution was added with the oxidizing agent and re-extracted in the same manner as above. After adding 2-propanol, the extract was evaporated to dryness under a reduced pressure to obtain ruthenium oxide.

To the residual solution after the re-extraction, was added methanol in an amount twice the amount of the residual solution to form white precipitate. The precipitate was separated by filtration, dissolved in water, re-precipitated by addition of methanol and vacuum-dried at 60° C. for 5 hours to obtain Product XVI.

Product XVI was analyzed by $^{13}$C-NMR and IR, and as a result thereof, found to be the sodium salt of tricarboxystarch in which 100% by mole of the primary alcohol radicals at C6 position of the glucopyranose unit constituting the starting corn starch were oxidized to carboxyl groups, and 75% by mole of the secondary alcohol radicals at C2 and C3 positions were oxidized to carboxyl groups with cleavage of the bond between C2 and C3 positions. The concentration of ruthenium in Product XVI was measured by ICP and found to be 5 ppm (ruthenium removal ratio: 99.96% by weight).

EXAMPLE 8

One of the 40-g portions prepared in Example 7 was extracted in the same manner as in Example 7 except for omitting the heat treatment to obtain Product XVII. As a result of analysis by $^{13}$C-NMR and IR, Product XVII was found to be the same sodium salt of tricarboxystarch as that obtained in Example 7. The concentration of ruthenium in Product XVII measured by ICP was 87 ppm (ruthenium removal ratio: 99.42% by weight).

EXAMPLE 9

One of the 40-g portions prepared in Example 7 was treated in the same manner as in Example 7 except for conducting the heat treatment at 80° C. at ordinary pressure to obtain Product XVIII. As a result of analysis by $^{13}$C-NMR and IR, Product XVIII was found to be the same sodium salt of tricarboxystarch as that obtained in Example 7. The concentration of ruthenium in Product XVIII measured by ICP was 12 ppm (ruthenium removal ratio: 99.92% by weight).

EXAMPLE 10

One of the 40-g portions prepared in Example 7 was treated in the same manner as in Example 7 except for conducting the heat treatment at 50° C. at ordinary pressure to obtain Product XIX. As a result of analysis by $^{13}$C-NMR and IR, Product XIX was found to be the same sodium salt of tricarboxystarch as that obtained in Example 7. The concentration of ruthenium in Product XIX measured by ICP was 30 ppm (ruthenium removal ratio: 99.80% by weight).

EXAMPLE 11

One of the 40-g portions prepared in Example 7 was treated in the same manner as in Example 7 except for conducting the heat treatment for 30 minutes to obtain Product XX. As a result of analysis by $^{13}$C-NMR and IR, Product XX was found to be the same sodium salt of tricarboxystarch as that obtained in Example 7. The concentration of ruthenium in Product XX measured by ICP was 6 ppm (ruthenium removal ratio: 99.96% by weight).

EXAMPLE 12

One of the 40-g portions prepared in Example 7 was treated in the same manner as in Example 7 except for conducting the extraction prior to the heat treatment by only a single portion of n-heptane to obtain Product XXI. As a result of analysis by $^{13}$C-NMR and IRS Product XX was found to be the same sodium salt of tricarboxystarch as that obtained in Example 7. The concentration of ruthenium in Product XI measured by ICP was 73 ppm (ruthenium removal ratio: 99.51% by weight,).

EXAMPLE 13

One of the 40-g portions prepared in Example 7 was treated in the same manner as in Example 7 except that the residual solution after the second extraction process was further subjected to, prior to the isolation of the carboxystarch, the same treatments as those of the first extraction process, the heat treatment and the second extraction process, thereby obtaining Product XXII. As a result of analysis by $^{13}$C-NMR and IR, Product XII was found to be the same sodium salt of tricarboxystarch as that obtained in Example 7. The concentration of ruthenium in Product X measured by ICP was lower than the limit of detection.

EXAMPLE 14

One of the 40-g portions prepared in Example 7 was treated in the same manner as in Example 7 except for omitting the first extraction process to obtain Product XXIII. As a result of analysis by $^{13}$C-NMR and IR, Product XXII was found to be the same sodium salt of tricarboxystarch as that obtained in Example 7. The concentration of ruthenium in Product XXIII measured by ICP was 95 ppm (ruthenium removal ratio: 99.37% by weight).

EXAMPLE 15

One of the 40-g portions prepared in Example 7 was treated in the same manner as in Example 14 except for omitting the heat treatment to obtain Product XXIV. As a result of analysis by $^{13}$C-NMR and IR, Product XXIV was found to be the same sodium salt of tricarboxystarch as that obtained in Example 7. The concentration of ruthenium in Product XXIV measured by ICP was 126 ppm (ruthenium removal ratio: 99.2% by weight).

EXAMPLE 16

(First production of carboxypolysaccharide)

Into a 1-liter round bottom Pyrex flask equipped with a stirrer, a thermometer and a pump, were placed 50 ml of water, 15 g of corn starch (manufactured by Shikishima Starch Co., Ltd.) and 0.70 g (2.8 mmol) of ruthenium chloride (ruthenium content: 43% by weight) and the mixture was cooled to 20° C. over a cooling water bath while stirring. To the cooled mixture, was added over a period of 3 hours 12.9% by weight aqueous solution of sodium hypochlorite in an amount corresponding to 5 moles of sodium hypochlorite per one mole of the starch. The reaction solution was adjusted to pH 9.0 using 2N aqueous solution of sodium hydroxide.

After the reaction was completed, 12.9 g of 12.9% by weight aqueous solution of sodium hypochlorite and 130 g of n-heptane were added to 452 g of the reaction solution. The resultant mixture was shaken at room temperature for 1 minute, centrifuged under 2,000 rpm for 1 minute and left standing for 1 minute. Then, the n-heptane layer dissolving ruthenium tetraoxide was separated from the aqueous layer. This operation of extraction was repeated 4 times at room temperature. After adding 1.5 g of 2-propanol, the combined extract was evaporated to dryness under a reduce pressure to obtain ruthenium oxide.

To the residual solution after the extraction, was added methanol in an amount twice the amount of the residual solution to from white precipitate. The precipitate was separated by filtration, dissolved in water, re-precipitated by addition of methanol and vacuum-dried at 60° C. for 5 hours to obtain 23.9 g of Product XXV.

Product XXV was analyzed by $^{13}$C-NMR, IR and XRF, and found to contain 99.5% by weight (94.4% yield) of a sodium salt of tricarboxystarch in which 100% by mole of the primary alcohol radicals at C6 position of the glucopyranose unit constituting the starting corn starch were oxidized to carboxyl groups and 75% by mole of the secondary alcohol radicals at C2 and C3 positions were oxidized to carboxyl groups with cleavage of the bond between C2 and C3 positions, and 0.5% by weight of sodium chloride. The concentration of ruthenium in Product XXV measured by ICP was 126 ppm (ruthenium removal ratio: 99.2% by weight).

(Second production of carboxypolysaccharide using recovered ruthenium)

Ruthenium oxide obtained by vacuum-drying was dispersed in 45 g of water. Using the resultant dispersion, the oxidation of the polysaccharide and the extraction of ruthenium were conducted in the same manner as in the first production of carboxypolysaccharide. The residual solution after the extraction was subjected to the same treatments as in the first production of carboxypolysaccharide to obtain 23.5 g of Product XXVI. Product XXVI was analyzed by $^{13}$C-NMR, IR and XRF, and found to contain 99.4% by weight (92.7% yield) of the same sodium salt of tricarboxystarch as Product XXV obtained in the first production process and 0.6% by weight of sodium chloride.

EXAMPLE 17

(First production of carboxypolysaccharide)

The oxidation reaction of corn starch was conducted in the same manner as in Example 16 except for using 0.600 g (2.8 mmol) of ruthenium oxide (ruthenium content: 47% by weight). After the reaction was completed, the reaction solution was extracted with n-heptane 4 times in the same manner as in Example 16. The residual solution after the extraction was introduced into a 1-liter round bottom Pyrex flask equipped with a thermometer and a condenser, and heated to 98° C. over an oil bath under refluxing for 2 hours. After cooling, the heat-treated solution was extracted again with four portions of n-heptane. The residual solution after the extraction was treated in the same manner as in Example 16 to obtain 23.6 g of Product XXVII.

The Product XXVII was analyzed by $^{13}$C-NMR, IR and XRF, and found to contain 99.5% by weight (93.2% yield) of the same sodium salt of tricarboxystarch as Product XXV and 0.5% by weight of sodium chloride. The concentration of ruthenium in Product XXVII measured by ICP was 5 ppm (ruthenium removal ratio: 99.96% by weight).

The n-heptane extract was treated in the same manner as in Example 16 except for adding 2 g of 30% aqueous solution of hydrogen peroxide to obtain ruthenium oxide.

(Second production of carboxypolysaccharide using recovered ruthenium)

Ruthenium oxide recovered in the first production process was dispersed in 45 g of water. Using the obtained dispersion, the oxidation of the polysaccharide and the extraction of ruthenium were conducted in the same manner as in the first production of carboxypolysaccharide. The residual solution after the extraction was subjected to the same treatments as in the first production of carboxypolysaccharide to obtain 23.8 g of Product XXVIII. Product XXVIII was analyzed by $^{13}$C-NMR, IR and XRF, and found to contain 99.4% by weight (93.9% yield) of the sodium salt of tricarboxystarch same as Product XXVII and 0.6% by weight of sodium chloride.

EXAMPLE 18

In the same manner as in Example 16 except for using 10% by weight aqueous solution of hydrazine hydrochloride in place of 2-propanol, 23.3 g of Product XXIX was obtained in the first production process. Further, using the recovered ruthenium, 23.5 g of Product XXX was obtained in the second production process. Products XXIX and XXX were analyzed by $^{13}$C-NMR. IR and XRF, and it was found that Product XXX contained 99.6% by weight (92.1% yield) of the sodium salt of tricarboxystarch same as that obtained in Example 16 and 0.4% by weight of sodium chloride, and Product XXX contained 99.5% by weight (92.8% yield) of the sodium salt of tricarboxystarch same as that obtained in Example 16 and 0.5% by weight of sodium chloride.

EXAMPLE 19

In the same manner as in Example 16 except for using 10% by weight aqueous solution of hydroxylamine hydrochloride place of 2-propanol, 23.4 g of Product XXXI was obtained in the first production process. Further, using the recovered ruthenium, 23.4 g of Product XXXII was obtained in the second production process. Products XXXI and XXXII were analyzed by $^{13}$C-NMR, IR and XRF, and it was found the Product XXXI contained 99.3% by weight (92.2% yield) of the sodium salt of tricarboxystarch same as that obtained in Example 16 and 0.7% by weight of sodium chloride, and Product XXXII contained 99.5% by weight (92.4% yield) of the sodium salt of tricarboxystarch same as that obtained in Example 16 and 0.5% by weight of sodium chloride.

As described above in detail, according to the process of the present invention, expensive ruthenium used in the production of the carboxypolysaccharide is easily and efficiently recovered and reused in the subsequent production of the carboxypolysaccharide. Also, the efficient recovery of ruthenium provides the carboxypolysaccharide with a low ruthenium content.

What is claimed is:

1. A process for producing a carboxypolysaccharide, comprising the steps of:
   (1) oxidizing a polysaccharide in an aqueous medium using a combination of a ruthenium compound and an oxidizing agent;
   (2) adding an oxidizing agent to a reaction mixture obtained after the oxidation to convert ruthenium to high oxidation state;
   (3) recovering the ruthenium of high oxidation state by extracting the reaction mixture with a water-insoluble organic solvent; and
   (4) separating the carboxypolysaccharide from a residual solution after the ruthenium recovery of the step (3).

2. The process according to claim 1, wherein the oxidizing agents in the steps (1) and (2) are the same or different, and each is at least one selected from the group consisting of halogen, halogen oxide, perhalogenic acid, salt of perhalogenic acid, halogenic acid, salt of halogenic acid, halogenous acid, salt of halogenous acid, hypohalogenous acid, salt of hypohalogenous acid, oxygen, peracid, peroxide, persulfuric acid, salt of persulfuric acid and salt of ferricyanic acid.

3. The process according to claim 1, wherein the water-insoluble organic solvent is selected from the group consisting of a saturated aliphatic hydrocarbon, a saturated alicyclic hydrocarbon and a halogenated hydrocarbon.

4. The process according to claim 1, wherein an extraction temperature is 0 to 100° C. at ordinary pressure.

5. The process according to claim 1, further comprising a step of recovering ruthenium by adding reducing agent to an extract obtained the step (3) and a step of reusing the recovered ruthenium in a subsequent oxidation of the polysaccharide.

6. The process according to claim 5, wherein the reducing agent is at least one selected from the group consisting of salt of sulfurous acid, hydrazine, salt of hydrazine, hydroxylamine, salt of hydroxylamine, hydrogen peroxide, quinone compound and lower alcohol.

7. A process for producing a carboxypolysaccharide, comprising the steps of:

(1) oxidizing a polysaccharide in an aqueous medium using a combination of a ruthenium compound and an oxidizing agent;

(2) adding an oxidizing agent to a reaction mixture obtained after the oxidation to convert ruthenium to high oxidation state;

(3) recovering the ruthenium of high oxidation state by extracting the reaction mixture with a water-insoluble organic solvent;

(4) heat-treating a residual solution after the step (3) at 50° C. to a boiling point of the residual solution at ordinary pressure;

(5) adding an oxidizing agent to the residual solution after the heat treatment to convert a remaining ruthenium to high oxidation state;

(6) recovering the ruthenium of high oxidation state by extracting the residual solution with a water-insoluble organic solvent; and (7) separating the carboxypolysaccharide from the residual solution after the ruthenium recovery of the step (6).

8. The process according to claim 7, wherein the reaction mixture obtained in the step (1) is heat-treated at 50° C. to a boiling point of the reaction mixture at ordinary pressure prior to the step (2).

9. The process according to claim 7, wherein the oxidizing agents used in the steps (1), (2) and (5) are the same or different, and each is at least one selected from the group consisting of halogen, halogen oxide, perhalogenic acid, salt of perhalogenic acid, halogenic acid, salt of halogenic acid, halogenous acid, salt of halogenous acid, hypohalogenous acid, salt of hypohalogenous acid, oxygen, peracid, peroxide, persulfuric acid, salt of persulfuric acid and salt of ferricyanic acid.

10. The process according to claim 7, wherein the water-insoluble organic solvents in the steps (3) and (6) are the same or different, and each is selected from the group consisting of a saturated aliphatic hydrocarbon, a saturated alicyclic hydrocarbon and a halogenated hydrocarbon.

11. The process according to claim 7, wherein an extraction temperature in the steps (3) and (6) is 0 to 100° C. at ordinary pressure.

12. The process according to claim 7, further comprising a step of recovering ruthenium by adding a reducing agent to an extract obtained in the steps (3) and (6), and a step of reusing the recovered ruthenium in a subsequent oxidation of the polysaccharide.

13. The process according to claim 12, wherein the reducing agent is at least one selected from the group consisting of alt of sulfurous acid, hydrazine, salt of hydrazine, hydroxylamine, salt of hydroxylamine, hydrogen peroxide, quinone compound and lower alcohol.

14. A process for producing a carboxypolysaccharide, comprising the steps of:

(1) oxidizing a polysaccharide in an aqueous medium using a combination of a ruthenium compound and an oxidizing agent;

(2) heat-treating a reaction mixture obtained after the oxidation at 50° C. to a boiling point of the reaction mixture at ordinary pressure;

(3) adding an oxidizing agent to the reaction mixture after the heat treatment to convert ruthenium to high oxidation state;

(4) recovering the ruthenium of high oxidation state by extracting the reaction mixture with a water-insoluble organic solvent; and (5) separating the carboxypolysaccharide from a residual solution after the ruthenium recovery of the step (4).

15. The process according to claim 14, wherein the oxidizing agents used in steps (1) and (3) are the same or different, and each is at least one selected from the group consisting of halogen, halogen oxide, perhalogenic acid, salt of perhalogenic acid, halogenic acid, salt of halogenic acid, halogenous acid, salt of halogenous acid, hypohalogenous acid, salt of hypohalogenous acid, oxygen, peracid, peroxide, persulfuric acid, salt of persulfuric acid and salt of ferricyanic acid.

16. The process according to claim 14, wherein the water-insoluble organic solvent is selected from the group consisting of a saturated aliphatic hydrocarbon, a saturated alicyclic hydrocarbon and a halogenated hydrocarbon.

17. The process according to claim 14, wherein an extraction temperature is 0 to 100° C. at ordinary pressure.

18. The process according to claim 14, further comprising a step of recovering ruthenium by adding a reducing agent to an extract obtained in the step (4) and a step of reusing the recovered ruthenium in a subsequent oxidation of the polysaccharide.

19. The process according to claim 18, wherein the reducing agent is at least one selected from the group consisting of salt of sulfurous acid, hydrazine, salt of hydrazine, hydroxylamine, salt of hydroxylamine, hydrogen peroxide, quinone compound and lower alcohol.

* * * * *